US008065958B2

(12) United States Patent
Thiem et al.

(10) Patent No.: US 8,065,958 B2
(45) Date of Patent: Nov. 29, 2011

(54) USE OF POLYMERS COMPRISING AMINO GROUPS MODIFIED BY ACID GROUPS FOR PRODUCING HUMIDIFYING AGENTS OR HUMIDIFYING AGENT CONCENTRATES, IN ADDITION TO HUMIDIFYING AGENT CIRCUITS FOR OFFSET PRINTING

(75) Inventors: Roland Thiem, Steinheim (DE); Heike Becker, Mannheim (DE); Martin Scholtissek, Wachenheim (DE); Wolfgang Lorenz, Dietzenback (DE)

(73) Assignee: Flint Group Germany GmbH, Stuttgart (DE)

( * ) Notice: Subject to any disclaimer, the term of this patent is extended or adjusted under 35 U.S.C. 154(b) by 619 days.

(21) Appl. No.: 11/720,022

(22) PCT Filed: Nov. 24, 2005

(86) PCT No.: PCT/EP2005/012570
§ 371 (c)(1),
(2), (4) Date: Feb. 13, 2008

(87) PCT Pub. No.: WO2006/056439
PCT Pub. Date: Jun. 1, 2006

(65) Prior Publication Data
US 2008/0257190 A1 Oct. 23, 2008

(30) Foreign Application Priority Data
Nov. 26, 2004 (DE) .......................... 10 2004 057 294

(51) Int. Cl.
*B41N 1/00* (2006.01)
*B41N 3/00* (2006.01)
(52) U.S. Cl. .......................... 101/465; 101/147; 101/148

(58) Field of Classification Search .................. 101/451, 101/147, 148
See application file for complete search history.

(56) References Cited

U.S. PATENT DOCUMENTS

| 3,568,598 | A | * | 3/1971 | Abbott et al. ................. 101/465 |
| 4,116,896 | A |   | 9/1978 | Garrett et al. |
| 4,403,550 | A | * | 9/1983 | Sharp ............................ 101/452 |
| 5,067,401 | A | * | 11/1991 | Kusanagi ....................... 101/148 |
| 5,217,813 | A |   | 6/1993 | Roser et al. |
| 5,308,388 | A | * | 5/1994 | Schell ................................. 106/2 |
| 5,565,290 | A | * | 10/1996 | Itakura et al. ................. 430/104 |
| 5,714,302 | A |   | 2/1998 | Urasaki et al. |
| 5,965,660 | A | * | 10/1999 | Kasai et al. .................... 524/547 |
| 6,593,068 | B1 |   | 7/2003 | Watanabe et al. |

FOREIGN PATENT DOCUMENTS

| DE | 4401619 A1 | 7/1994 |
| DE | 19719936 A1 | 11/1998 |
| EP | 0091801 A2 | 10/1983 |
| EP | 0490231 A2 | 6/1992 |
| EP | 1099566 A1 | 5/2001 |
| EP | 1099567 A1 | 5/2001 |
| JP | 02292092 | 12/1990 |
| JP | 07125472 | 5/1995 |
| JP | 2003276357 | 9/2003 |
| JP | 2004160869 | 6/2004 |
| WO | WO-9740087 A1 | 10/1997 |

* cited by examiner

*Primary Examiner* — Joshua D Zimmerman
*Assistant Examiner* — Shema Freeman
(74) *Attorney, Agent, or Firm* — Connolly Bove Lodge & Hutz LLP

(57) ABSTRACT

The use of polymers which comprise amino groups modified with acid groups for the preparation of fountain solutions for offset printing. A process for printing by means of the offset technique, in which a fountain solution which comprises polymer which comprises amino groups modified with acid groups is used.

10 Claims, No Drawings

USE OF POLYMERS COMPRISING AMINO GROUPS MODIFIED BY ACID GROUPS FOR PRODUCING HUMIDIFYING AGENTS OR HUMIDIFYING AGENT CONCENTRATES, IN ADDITION TO HUMIDIFYING AGENT CIRCUITS FOR OFFSET PRINTING

RELATED APPLICATIONS

This application is a national stage application (under 35 U.S.C. §371) of PCT/EP2005/012570 filed Nov. 24, 2005, which claims benefit of German application 10 2004 057 294.1 filed Nov. 26, 2004.

The invention relates to the use of polymers which comprise amino groups modified with acid groups for the preparation of fountain solutions for offset printing. It furthermore relates to a process for printing by means of the offset technique, in which a fountain solution which comprises polymer which comprises amino groups modified with acid groups is used.

In offset printing, a printing plate which has substantially no height differences is used. Rather, the image and the non-image parts of an offset printing plate have different wetting properties, i.e. hydrophobic and hydrophilic regions. An offset printing plate usually comprises a substrate which is provided with a suitable hydrophobic coating. In the nonimage parts, the photosensitive layer is removed so that the hydrophilic substrate is bared. For offset printing, an oil-based printing ink is used. Here, the hydrophobic regions of the printing plate can be wet with printing ink, and the hydrophilic regions cannot be wet with printing ink. Further details of the offset printing technique are to be found, for example, in Römpp-Lexikon "Lacke und Druckfarben", Georg Thieme Verag, Stuttgart, N.Y. 1998, pages 167 to 170.

For example, an offset printing plate is clamped on the printing cylinder for the printing process. Two further rollers, the so-called inking roller and the so-called dampening roller, touch the printing cylinder.

An all-based printing ink is transferred to the printing plate by means of the inking roller, and the so-called fountain solution is applied to the plate surface by means of the dampening roller. The fountain solution comprises water in which various assistants have been dissolved. The fountain solution is prepared as a rule by diluting a fountain solution concentrate. Additional additives can, if appropriate, subsequently be metered separately into the water or into the fountain solution.

The fountain solution has the function of producing, on the nonprinting parts of the printing plate, a stable moisture film which prevents the acceptance of the offset printing ink on these parts of the printing plate. In this context, it is unimportant whether, on applying a fountain solution and ink to the printing plate, first the fountain solution and then the ink are applied during each revolution of the plate cylinder, or whether this takes place in the converse order. The ink applied imagewise is first printed from the printing cylinder onto the so-called rubber blanket cylinder and from there onto the paper.

From the dampening roller, the fountain solution is transferred both into the printing parts and into the nonprinting parts of the printing plate. The amount of fountain solution transferred can be controlled, for example by means of the speed of the feed roller in the dampening unit. In the non-printing parts, the fountain solution ensures that the parts become hydrophilic. In the printing parts, an ink-water emulsion forms from the fountain solution and the printing ink.

A good printed copy in offset printing depends very substantially on the amount of fountain solution which is transferred to the printing plate.

If too little fountain solution is transferred, the hydrophilic parts do not sufficiently repel the printing ink, so that non-printing parts, too, are at least partly wetted with printing ink and ink is thus transferred to the paper in an undesired manner. The printer refers to this printing fault as greasing or smearing. If too much fountain solution is transferred, too much water is incorporated into the printing ink emulsion, so that the rheological properties of the printing ink are adversely affected. This manifests itself, for example, in decreasing color strength or in problems with ink transfer to the rubber blanket cylinder or the paper.

The part in which a sufficient amount of fountain solution is transferred in order to achieve the repellent effect, but on the other hand not too much, is referred to by the person skilled in the art as "water window". For stable printing, the "water window" should be as broad as possible so that even small changes in the water transport do not lead to undesired faults in the printing process which result in broke.

In general, it is desirable to achieve sufficient repellency with as small amounts of fountain solution as possible, in order to avoid excessive emulsification of the ink and, for example, an associated decrease in the color strength.

It is known that water-soluble film-forming colloids or polymers can be used as assistants in fountain solutions. Film-forming colloids and water-soluble polymers have the function of promoting the establishment of a stable water film on the nonprinting layer of the printing plate, so that constant print quality is achieved during printing and so that printing can be resumed immediately when the machine is shut down, without a great deal of startup waste. Furthermore, a polymer such as gum arabic serves for protecting the plate from mechanical damage during storage and archiving of printing plates.

DE 197 19 936 discloses the use of gum arabic for the preparation of fountain solutions. EP 1099566 and EP 1099567 disclose gum arabic, various starch derivatives, alginates, cellulose derivatives and modifications thereof, polyethylene glycols and copolymers thereof, polyvinyl alcohols and its derivatives, polyacrylamides, polyacrylic acid and copolymers based on maleic anhydride and polyvinyl methyl ether, polymers based on styrenesulfonic acid or polyvinylpyrrolidone.

It is furthermore known that derivatives of cellulose, such as, for example, carboxymethylcellulose, hydroxyethylcellulose, hydroxypropylcellulose, methylcellulose or combinations thereof, can be used. Reference may be made to JP-A 02-292092, JP-A 07-125472, JP-A 2003-276357 or JP-A 2004-160869 by way of example.

The most widely used polymer for fountain solutions is gum arabic. Gum arabic is a mixture of various polysaccharides, such as L-arabinose, L-rhamnose, D-galactose and D-glucuronic acid and is obtained as a resin from the sap of various acacia and mimosa varieties. With the use of gum arabic, however, relatively large amounts of water are required in order to achieve a stable moisture film on the offset printing plate. Further weaknesses of gum arabic are its foaming and foam-stabilizing properties, its strong natural color and its comparatively poor solubility. As it is a natural product, it is available in variable quality. For so-called brush or centrifugal dampening units, frequently used in newspaper printing, it is absolutely essential to avoid the production and stabilization of foam in the fountain solution on application onto the printing plate, since nonuniform dampening and hence print defects may otherwise occur.

Other polymers among said polymers have the negative property that they may leave behind tacky deposits on the printing plate and on the rubber blanket cylinder. This leads to the accumulation of paper dust and ink particles, necessitating regular cleaning of the printing plate or rubber blanket cylinder and resulting in a time loss in the printing process. Furthermore, the polymers used must not have any harmful effects on the printing plate, in particular the image-imparting areas.

Fountain solutions for offset printing usually furthermore comprise, in addition to water, a large number of very different assistants, such as, for example, buffer systems, surfactants, antifoams, biocides and corrosion inhibitors.

In addition, short-chain alcohols are as a rule used as assistants, in particular isopropanol, ethanol or mixtures thereof. High-boiling glycol ethers are also used as substitutes for isopropanol. Fountain solutions may comprise up to 30% by weight of isopropanol or other, short-chain alcohols. Isopropanol increases, inter alia, the viscosity of the fountain solution; this makes it easier to transfer a great deal of water onto the plate. Furthermore, it helps to achieve stable emulsifying conditions in the emulsification of water in printing ink. However, the release of organic solvents in printing works is generally undesired. It is therefore extremely desirable to provide a fountain solution in which the proportion of isopropanol is as small as possible and can even be completely dispensed with.

It was an object of the invention to provide an improved fountain solution for offset printing, in which a stable water film can be obtained even with transfer of a relatively small amount of water, and in which the necessary amount of isopropanol or of substitutes of isopropanol can be at least substantially reduced without adversely affecting the results.

Accordingly, the use of polymers which comprise amino groups modified with acid groups for the preparation of fountain solutions for offset printing was found. Furthermore, a process for printing by means of the offset technique, in which a fountain solution which comprises polymer which comprises amino groups modified with acid groups was found.

Regarding the invention, the following may be stated specifically:

For the preparation of the fountain solution for the offset printing process according to the invention, polymers P which comprise amino groups modified with acid groups are used. The polymers P may be straight-chain or branched polymers.

The polymers P may also be used for the preparation of fountain solution concentrates, which are diluted for use as fountain solutions, or they can also be used in fountain solution circulations.

The amino groups modified with acid groups are structural units of the general formula selected from the group consisting of (I), (II) and (III).

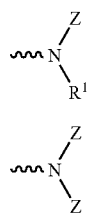

(I)

(II)

(III)

Here, the structural units may be part of a polymer chain, as in the case of (III), or they may be arranged as side units or terminal units on the polymer chain, as in case (I) or (II). The term "polymer chain" is to be understood as meaning both the polymer main chain, i.e. the longest chain forming the polymer, and shorter or longer branches of the polymer chain.

The polymer chain is composed of carbon atoms arranged in series by means of covalent bonds, but this carbon chain may be interrupted by hetero atoms, in particular nitrogen and, if appropriate, also oxygen or other functional groups. The chain is preferably interrupted by N atoms and, if appropriate, O atoms.

In addition to the structural units (I), (II) and/or (III), the polymer may also comprise further functional groups. These may be in particular primary, secondary and/or tertiary amino groups. Other functional groups may also be present, provided that no negative properties occur in the use as fountain solution. Ether groups —O— and OH groups may be mentioned in particular here. In addition to the amino groups and the functionalized amino groups, preferably no further functional groups or at least substantially no further functional groups are present.

The group Z is a structural unit having acid groups, and $R^1$ is H or a straight-chain or branched hydrocarbon radical which preferably comprises 1 to 20 carbon atoms and, if appropriate, may also have further substituents or hetero atoms. $R^1$ is preferably H.

The structural unit Z having acid groups may comprise one or more acid groups $R^2$. Examples of suitable acid groups comprise in particular carboxyl groups —COOH, sulfo groups —SO$_3$H and phosphonic acid groups —PO$_3$H$_2$, but other acid groups may also be present. Said acid groups are preferably —COOH groups. The acid groups may be present as free acids, but they may also be salts of the acids, in particular alkali metal salts and/or alkaline earth metal salts.

The acid groups $R^2$ are as a rule bonded to the nitrogen atom via a linking group X. In this case, Z has the general formula —XR$^2{}_n$, where X is a n-valent organic radical and n is a natural number greater than or equal to 1. n is preferably from 1 to 5, and particularly preferably 1 or 2.

The n-valent organic radical X may be a straight-chain or branched, aliphatic, aromatic or araliphatic radical. It is preferably an aliphatic radical which comprises from 1 to 10 carbon atoms, preferably from 1 to 5, particularly preferably from 1 to 3, carbon atoms and very particularly preferably 1 or 2 carbon atoms. Divalent organic radicals are particularly preferred. Particularly preferred groups are methylene or 1,2-ethylene groups.

Examples of preferred structural units Z comprise —CH$_2$CH$_2$SO$_3$H, —CH$_2$SO$_3$H, —CH$_2$CH$_2$PO$_3$H$_2$, —CH$_2$PO$_3$H$_2$, —CH$_2$COOH, —CH$_2$CH$_2$COOH, —CH$_2$(COOH)CH$_2$—COOH, —CH$_2$CH(CH$_3$)COOH and —CH$_2$CH(CH$_2$COOH)COOH. The structural units may be present as free acids or in the form of salts, such as, for example, alkali metal salts. They may furthermore be present in the form of internal salts comprising the acid groups and the modified and unmodified amino groups of the polymer. —CH$_2$—COOH and —CH$_2$CH$_2$COOH are particularly preferred.

The number of modified amino groups and/or unmodified amino groups in the polymers used is determined by the person skilled in the art according to the desired properties of the fountain solution. However, the number should be at least so high that the polymers are soluble to give a clear solution in the concentrates used in the fountain solution. In general, the ratio of carbon atoms to nitrogen atoms in the polymer is from 6:1 to 1.5:1 and, for example, about 4:1, without there being any intention thereby to limit the invention to this range.

The weight average $M_w$ of the polymers P used for the preparation of the fountain solution is chosen by the person skilled in the art according to the desired properties of the fountain solution. In general, a molecular weight $M_w$ of from 500 to 2 000 000 g/mol, preferably from 1000 to 1 500 000 g/mol, particularly preferably from 2000 to 1 200 000 g/mol and very particularly preferably from 10 000 to 1 200 000 g/mol and, for example, from 50 000 to 480 000 g/mol has proven useful. The weight average molecular weight was determined by means of light scattering.

The polymers described and their preparation are known in principle. Reference may be made here to EP-A 490 231 and WO 97/40087 by way of example.

The polymers P used according to the invention can be prepared, for example, by functionalizing polymers having primary and/or secondary amino groups by means of suitable reagents. Some or all of the amino groups present are converted thereby functionalization into structural units (I), (II) and/or (III). The degree of functionalization can be from 1 to 100%, preferably it is from 50 to 100%, particularly preferably from 70 to 100%.

In principle, all types of polymers containing amino groups can be used as starting materials for the modification. In addition to the amino groups, these may also have further functional groups, provided that these do not influence the modification and have no adverse effects.

For example, polyvinylamines are suitable as starting materials. These may be homopolymers of vinylamine or copolymers of vinylamine and other comonomers. Suitable comonomers are, for example, monoolefinically unsaturated carboxylic acids, such as, for example, acrylic acid, methacrylic acid and maleic acid, vinylamides, such as vinylpyrrolidone and vinylcaprolactam, and furthermore vinylimidazole, vinyl acetate, olefins, vinyl alcohol, vinylsulfonic acid and vinylphosphonic acid. As a rule, however, the amount of comonomers should not exceed 30% by weight, based on the amount of all monomers. Vinylamine homopolymers are preferred.

Polyalkylenimines, such as, for example, polypropylenimine, polyethylenimine or copolymers of propylenimine and ethylenimine are furthermore suitable. Polyethylenimines are preferred.

Polymers which contain amino groups and comprise polyalkylenepolyamine units, such as diethylenetriamine, triethylenetetramine, tetraethylenepentamine, pentaethylenehexamine, diaminopropyleneethylenediamine, trisaminopropylamine and polyethylenimine, which are linked to one another by means of the monomers, are furthermore suitable. For example, polyamidoamines can be prepared by linking said polyalkylenepolyamine units with $C_4$-$C_{10}$-dicarboxylic acids. Suitable dicarboxylic acids are, for example, succinic acid, maleic acid, adipic acid, glutaric acid, suberic acid, sebacic acid or terephthalic acid or derivatives thereof, such as, for example, esters or anhydrides thereof.

Polyetheramines can be used in the corresponding manner. Compounds of this type are disclosed, for example, in DE-A 29 16 356. The polyetheramines can be obtained by condensation of said polyalkylenepolyamine units with chlorohydrin ethers at elevated temperatures.

It is also possible to use polymers in which a suitable starting polymer is reacted with ethylenimine. Graft copolymers which comprise polyethylenimine units form here. Suitable starting materials comprise, for example, the abovementioned polyamidoamines, polyetheramines or polyvinylamines.

The polymers containing amino groups can also be modified before being used. They can be reacted, for example, with alkylating agents so that some of the amino groups are alkylated. A suitable alkylating agent is an alkyl bromide of the general formula $R^1$—Br, where $R^1$ was defined at the outset.

The polymers P used as starting materials may also be crosslinked. This may of course comprise only partial crosslinking. A sufficient proportion of amino groups must always remain. The degree of crosslinking can be chosen by the person skilled in the art according to the desired properties of the fountain solution, provided that no negative properties are obtained. In particular, sufficient water solubility of the polymer should be maintained. As a rule, not more than 2% of the amino groups present in the starting polymer should react with the crosslinking agent. Preferably, <1% of the nitrogens are reacted with the crosslinking agent.

The crosslinking is as a rule advantageously carried out, as described here, before the modification. However, it is not intended to rule out carrying out the crosslinking in special cases only after the modification.

Suitable crosslinking agents are, for example, at least bifunctional crosslinking agents which have a halohydrin, glycidyl, aziridine or isocyanate unit or a halogen atom as functional groups. Examples of suitable crosslinking agents comprise epihalohydrins, such as, for example, epichlorohydrin, or $\alpha,\omega$-dichloroalkanes or vicinal dichloroalkanes, for example 1,2-dichloroethane, 1,2-dichloropropane, 1,3-dichloropropane, 1,4-dichlorobutane and 1,6-dichlorohexane.

Crosslinking agents which can be prepared starting from at least dihydric alcohols are particularly suitable for carrying out the invention. Examples comprise glycerol, ethoxylated or propoxylated glycerols, polyglycerols having 2 to 15 glycerol units, ethoxylated and/or propoxylated polyglycerols and polyalkylene glycols. Suitable polyalkylene glycols are, for example, polyethylene glycol, polypropylene glycol and polybutylene glycols and block copolymers of $C_2$- to $C_4$-alkylene oxides. The average molar masses ($M_w$) of the polyalkylene glycols are in general from 100 to 6000, preferably from 300 to 2000, g/mol.

Crosslinking agents which have at least two chlorohydrin units can be obtained from said, polyfunctional alcohols by reaction with epichlorohydrin, and $\alpha,\omega$-bis(epoxides) can be obtained from said crosslinking agents by treatment with bases. Further details of such crosslinking agents are described, for example, in U.S. Pat. No. 4,144,123 or DE-A 29 16 356. $\alpha,\omega$-Dichloroethers, such as, for example, $\alpha,\omega$-dichloropolyalkylene glycols, can be prepared from said polyfunctional polyalkoxyalcohols by the process disclosed in EP-A 0 025 515.

Crosslinking agents which comprise blocked isocyanate groups, for example trimethylhexamethylene diisocyanate blocked with 2,2,3,6-tetramethyl-4-piperidinone, are furthermore suitable. These crosslinking agents are disclosed, for example, in DE-A 40 28 285. Crosslinking agents comprising aziridine units and based on polyethers or substituted hydrocarbons, for example 1,6-bis-N-aziridinohexane, are furthermore suitable.

It is of course also possible to use mixtures of a plurality of different crosslinking agents, provided that they are compatible with one another. Particularly preferably used crosslinking agents are epihalohydrins, preferably epichlorohydrin, α,ω-bis(chlorohydrin)polyalkylene glycol ethers, α,ω-bis (epoxides) of the polyalkylene glycol ethers and/or bisglycidyl ethers of the polyalkylene glycols.

The crosslinking can be effected by methods known to the person skilled in the art. In general, the crosslinking is effected at a temperature of from 10 to 200° C., preferably from 30 to 100° C. The reaction is usually carried out at atmospheric pressure. The reaction times are dependent on the polymers containing amino groups and crosslinking agents which are used. In general, the duration of the reaction is from 0.5 to 20 h, preferably from 1 to 10 h. The crosslinking is carried out in general in aqueous solution.

The product obtained can be isolated or can be modified directly with the groups Z, without an isolation step.

Methods for modification with the groups Z are known to the person skilled in the art and are disclosed, for example, in EP-A 490 231 and WO 97/40087.

Very particularly preferably, the polymers used are water-soluble, carboxyalkylated polymers comprising amino groups. These may be in particular carboxymethylated groups or carboxyethylated groups. These may be obtained, for example, by a) reacting water-soluble polymers comprising amino groups with at least one aldehyde and an alkali metal cyanide or a cyanohydrin obtained from an aldehyde and an alkali metal cyanide in aqueous solution (cf. for example WO 97/40087), or b) reacting water-soluble polymers comprising amino groups with α,β-unsaturated compounds in a Michael addition reaction (cf. for example DE 42 44 194). Examples of suitable α,β-unsaturated compounds comprise monoethylenically unsaturated carboxylic acids, such as acrylic acid, methacrylic acid, dimethacrylic acid, ethylacrylic acid, allylacetic acid, vinylacetic acid, maleic acid, fumaric acid, itaconic acid, methylenemalonic acid, oleic acid and linolenic acid, but also vinylphosphonic acid and vinyl sulfonate.

Polymers P which are obtainable by modifying polyvinylamine and/or polyethylenimine are preferably used.

The modified polymers P can be isolated after the modification and, if appropriate, purified. Since the modification is carried out as a rule in aqueous solution, it is, however, also possible to use the resulting solution of the polymer directly for formulating the fountain solution or the fountain solution concentrate.

The solvent used for the fountain solution is as a rule water. However, the fountain solution can also comprise organic, water-miscible solvents. Monohydric or polyhydric low molecular weight alcohols, such as methanol, ethanol, n-propanol, isopropanol, glycols or glycol ethers or glycerol, are particularly suitable here. A preferred organic component is isopropanol.

However, the amount of such additional solvents in the fountain solution circulation should as a rule not exceed 30% by weight, based on the total amount of all solvents used. A concentrate may, if appropriate, also have a higher proportion. It is the particular advantage of the polymers used according to the invention that the proportion of organic constituents, i.e. especially isopropanol, can be substantially reduced compared with the prior art. The amount of organic solvents is preferably less than 15% by weight, based on the total amount of all solvents used. In particular, the amount of volatile organic solvents having a boiling point of not more than 100° C. is less than 10% by weight.

In a preferred embodiment of the present invention, the proportion of isopropanol is less than 10% by weight, particularly preferably less than 5% by weight, very particularly preferably less than 4% by weight and, for example, about 3% by weight. In a further, preferred embodiment of the invention, the fountain solution is one which is free of isopropanol.

However, it is of course also possible to use mixtures of a plurality of different polymers P. The concentration of the polymers P used according to the invention in the fountain solution is determined by the person skilled in the art according to the desired properties. It is as a rule from 10 to 0.05 g/l, preferably from 5 to 0.1 g/l, particularly preferably from 2 to 0.2 g/l.

Preferably only one or more of the polymers P are used. However, the fountain solution can moreover comprise further secondary polymers for precise adjustment of the properties. However, the amount of such secondary polymers should as a rule not exceed 50% by weight, preferably 20% by weight, particularly preferably 10% by weight, based on the total amount of all polymers used. Preferably, only the polymers P are used.

The choice of such secondary polymers is not limited, provided that the use does not result in any undesired properties. Examples of suitable secondary polymers comprise gum arabic, high molecular weight polyethylene glycol, high molecular weight polypropylene glycol or copolymers of ethylene glycol and propylene glycol. The person skilled in the art makes a suitable choice from the polymers suitable in principle, according to the desired properties of the fountain solution.

The fountain solution used according to the invention can moreover comprise conventional additives.

Conventional buffer systems for establishing the desired pH may be mentioned here in particular. Examples comprise acids which are known in principle to be weak, such as organic carboxylic acids, hydroxycarboxylic acids or phosphoric acids as a mixture with the alkali metal salts thereof, water-soluble amines or aminoalcohols.

The pH of the fountain solution used is usually from 3 to 9. Examples of further additives comprise:
Surfactants and relatively long-chain alcohols or diols for reducing the surface tension;
Glycols, glycol ethers and/or glycerol;
Antifoams for reducing the foam formation caused by the surfactants or other ingredients;
Biocides for suppressing or preventing attack by fungi, bacteria or yeasts;
Corrosion inhibitors for avoiding corrosion on metallic materials;
Complexing agents for avoiding precipitation or deposition of calcium salts or magnesium salts;
Drying accelerators;
Solubilizers from the group consisting of the xylenesulfonates or cumenesulfonates.

The person skilled in the art makes a suitable choice among the additives, according to the desired properties of the fountain solution.

The fountain solution can be prepared in a simple manner by thorough mixing of the components in a solvent. Preferably, a fountain solution concentrate is first prepared and is diluted with water and, if appropriate, isopropanol to the concentration for use only subsequently, in particular just before use. According to the invention, the fountain solution is used in conventional offset printing processes. Conventional offset processes comprise, as a rule, at least the following steps:

mounting an offset printing plate on a printing cylinder;
causing the printing cylinder to rotate;
transferring fountain solution to the printing plate with the aid of a dampening unit;
transferring printing ink to the printing plate with the aid of an inking unit;
transferring the printing ink from the printing plate to a rotating rubber blanket cylinder touching the printing plate;
transferring the printing ink from the rubber blanket cylinder to a print medium transported past a printing cylinder and in contact therewith.

It may comprise both sheet-fed offset and rotary offset printing. The present process is particularly advantageous in the case of dampening units which as a rule tend to produce foam. These are, for example, so-called brush or centrifugal dampening units, as frequently used in newspaper printing, i.e. coldset.

The fountain solution can be prepared beforehand, if appropriate by means of a fountain solution concentrate, and then introduced into the fountain solution circulation; however, it is also possible to meter one or more polymers P into the already filled fountain solution circulation, advantageously in the form of a fountain solution concentrate.

The use, according to the invention, of the modified polymers P containing amino groups leads to substantial improvements. The plates are reliably moistened even with transport of substantially less water, so that the startup waste can be substantially reduced at startup of printing or after an interruption.

Said polymers can be incorporated without difficulties in particular into formulations for fountain solution concentrates. They have no foaming or foam-stabilizing properties. The water window is greater than in the case of commercial polymers; this ensures higher production reliability. The polymers P are inert to the printing parts of the printing plate. High stability of the plate during the ink run is thus ensured.

The following examples are intended to illustrate the invention in more detail:

A fountain solution concentrate of the following formulation was used for the experiments:

| Component | Amount [% by wt.] | Remarks |
| --- | --- | --- |
| Polymer solution (40% strength solution in water) | 5.0 | i.e. 2.0% of polymer |
| Citric acid | 2.0 | |
| Trisodium citrate | 3.2 | |
| Glycerol | 3.0 | |
| Biocide | 3.0 | |
| Water | 83.8 | |
| Total | 100.0 | |

EXAMPLE

A modified polyethylenimine, preparable by the following method, was used:

196 g of polyethylenimine (anhydrous, $M_w$=25 000 g/mol (Lupasol® WF, from BASF AG)) were introduced under nitrogen into a four-necked flask having a metal stirrer and reflux condenser and diluted to 25% with 588 g of demineralized water. The mixture was heated to 70° C. with stirring, and 40 ml of a 22% strength aqueous solution of a crosslinking agent were added rapidly at this temperature. The crosslinking agent is a reaction product of a polyethylene glycol having an average molar mass of 1500 with epichlorohydrin. After the end of the addition, the mixture was stirred for 5 hours at 70° C. Thereafter, the mixture was heated to 80° C. and 263.2 g of acrylic acid were added dropwise at this temperature in the course of 3 hours. After the end of the addition, the solution was stirred for a further hour at 80° C. After cooling, a viscous, yellow-orange solution of the product having a solids content of 42% (2 h, reduced pressure/120° C.) and a K value (1% in water) of 17 was obtained.

The solution obtained was used without further purification for the preparation of the fountain solution concentrate.

Comparative Example

Instead of the modified polyethylenimine, gum arabic (Agum Z, from Eggen) was used as the polymer.

The fountain solution concentrate was produced in each case by thorough mixing of all components.

The polymer according to the example could be incorporated into the concentrate without problems. No solubility or compatibility problems were found.

In contrast, either gum arabic has to be preswelled in water and then diluted or comparatively expensive "instant powder" of gum arabic has to be used.

Offset Printing Experiments:

The printing experiments were carried out on a Heidelberger Speedmaster 74 Z sheet-fed offset printing press. The printing plate used was a commercial conventional positive offset printing plate. Printing was effected using a commercial red printing ink (K+E Novavit® 2 F 700 Magenta). The amount of fountain solution (fountain solution transport) was determined in a conventional manner by means of the rotational speed of the fountain roller. The amount is stated in relative units (potentiometer settings 0=no rotation of the dampening roller unit, 100=maximum settable rotational speed). The higher the value, the more fountain solution is transferred to the printing cylinder.

The fountain solution was prepared from the abovementioned concentrates according to the following formulation:

| Component | Amount |
| --- | --- |
| Fountain solution concentrate | 3% by volume |
| Isopropanol | 3% by volume |
| Water, 8° d | 94% by volume |
| Total | 100% by volume |

Determination of the Lower Limit of the Water Window (So-Called "Free Running")

The lower limit of the water window was first determined, i.e. the minimum amount of fountain solution which is required so that the hydrophilic parts of the offset printing plate are thoroughly wetted during printing so that they no longer accept printing ink and proper printing is thus possible.

| | Adjustment of dampening unit (potentiometer setting) |
| --- | --- |
| Example | 17 |
| Comparative example | 29 |

It is clear that the fountain solution according to the invention, comprising the polyethylenimine derivative, results in a stable water film on the plate with very much less water transport than the fountain solution according to the prior art comprising gum arabic.

Water Content on the Plate in the Water Window

In a printing experiment, the amount of water in the ink, i.e. in the hydrophobic parts, and on the plate, i.e. in the hydrophilic parts, was measured. The values were measured by means of a so-called graphometronic apparatus. This measures the water content in relation to a standard by means of NIR.

The offset printing plate used for the test had zones with high ink acceptance and zones of low ink acceptance. "Zones of high ink acceptance" means that the proportion of printing area is relatively great in this part and the proportion of nonprinting areas is relatively small. Conversely, in the case of "zones of low ink acceptance", the proportion of printing area is relatively small in this part and the proportion of nonprinting areas is relatively great.

In each case the water content in the printing parts in zones of high and in zones of low ink acceptance was determined. Furthermore, the water content in the nonprinting parts on the plate in the neighborhood of printing zones with high ink acceptance and with low ink acceptance was determined.

The aim of a fountain solution formulation is to produce, even at a low potentiometer setting, a water concentration in the nonprinting parts which is sufficient for free running, even if said nonprinting parts are surrounded by zones of high ink coverage.

In the parts of the printing plate in which zones of low ink coverage are present in the neighborhood of large nonprinting parts, overemulsification of the ink readily occurs, this manifests itself not only in a loss of tack and viscosity but also in a loss of color strength. In the present experiment, there were no indications of a loss of color strength at a high potentiometer setting.

The results of the measurements are listed in detail in tables 1 and 2.

TABLE 1

Measured values for example

| Water transport/ potentiometer setting [rel. units] | Water concentration in comparison with standard | | | | Density in solid area (simply density?) | |
|---|---|---|---|---|---|---|
| | Printing parts | Nonprinting parts | Printing parts | Nonprinting parts | | |
| | Zones of high ink acceptance | Zones of high ink acceptance | Zones of low ink acceptance | Zones of low ink acceptance | Zones of high ink acceptance | Zones of low ink acceptance |
| 17 | 13.8 | 8.8 | 20 | 8.4 | 1.63 | 1.65 |
| 20 | 15.1 | 11.1 | 22.3 | 10 | 1.64 | 1.63 |
| 23 | 16.4 | 13.1 | 24.4 | 12.1 | 1.61 | 1.59 |
| 26 | 17.7 | 14.1 | 26.5 | 13.8 | 1.64 | 1.55 |
| 29 | 19 | 14.6 | 28.6 | 15.3 | 1.65 | 1.54 |

TABLE 2

Measures values of comparative example

| Water transport/ potentiometer setting [rel. units] | Water concentration in comparison with standard | | | | Density of solid areas | |
|---|---|---|---|---|---|---|
| | Printing parts | Nonprinting parts | Printing parts | Nonprinting parts | | |
| | Zones of high ink acceptance | Zones of high ink acceptance | Zones of low ink acceptance | Zones of low ink acceptance | Zones of high ink acceptance | Zones of low ink acceptance |
| 29 | 13 | 8.4 | 19.9 | 10 | 1.65 | 1.61 |
| 32 | 15.2 | 13.6 | 22.6 | 13.4 | 1.67 | 1.60 |
| 35 | 16.3 | 16.4 | 26 | 17.5 | 1.63 | 1.59 |
| 38 | 17.4 | 17.8 | 28.4 | 19.7 | 1.65 | 1.53 |
| 41 | 18.6 | 18.5 | 31.5 | 21.9 | 1.63 | 1.52 |

Both the example and the comparative example show the usual trend that more water can also be found in the ink and on the plate by means of graphometronic determination with increasing water transport.

In the present case, the water transport was not further increased after the densities of solid areas had fallen below the value of 1.6 or 1.52. At higher water values, ink transfer faults occurred owing to an excessively high proportion of water in the ink.

With the use, according to the invention, of the polymers P, the necessary amount of water is obtained on the nonprinting parts of the plate even with a low level of water transport (example 8.8 at setting 17 and comparative example 8.4 at setting 29), said amount of water being required for "free running" of the plate. The polymer is therefore able to produce a stable film on the plate even when a small amount of water is supplied.

In the printing parts with high ink coverage, the same amount of water is in the ink in the example as well as in the comparative example, and the densities of the solid areas are likewise comparable.

In the parts of low water transport, on the other hand, more water is on the plate (nonprinting parts) and in the ink, which leads to a greater loss of density of solid areas.

For the printer, it is important to have a broad water window available relative to the starting value (potentiometer setting). In the case of the example, the water window is large at 70%, based on the starting value; in the case of the comparative example, it is only 40%.

The invention claimed is:

1. A process for printing by means of the offset technique comprising the steps of:
   (a) mounting an offset printing plate on a printing cylinder;
   (b) causing said printing cylinder to rotate;
   (c) transferring fountain solution to said printing plate with the aid of a dampening unit;
   (d) transferring printing ink to said printing plate with the aid of an inking unit;
   (e) transferring said printing ink from said printing plate to a rotating rubber blanket cylinder touching said printing plate;
   (f) transferring said printing ink from said rubber blanket cylinder to a print medium transported past a printing cylinder and in contact therewith;
wherein said fountain solution comprises water and at least one polymer P, which comprises amino groups modified with acid groups, and
wherein said amino groups modified with acid groups are selected from the group consisting of structural units of general formulae I, II, and III:

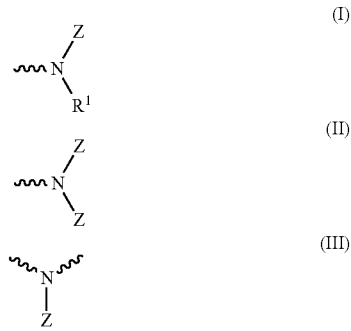

wherein
$R^1$ is H or a straight-chain or branched hydrocarbon radical; and
Z is a group of the general formula $-XR^2_n$, wherein
X is a n-valent organic radical,
n is a natural number greater than or equal to 1, and
$R^2$ is a group selected from the group consisting of —COOH and salts of —COOH.

2. The process according to claim 1, wherein said straight-chain or branched hydrocarbon radical comprises 1 to 20 carbon atoms.

3. The process according to claim 1, wherein Z is at least one group selected from the group consisting of CH2CH2COOH, salts of —CH2CH2COOH, —CH(COOH)CH2-COOH, salts of —CH(COOH)CH2-COON, —CH2CH(CH3)COOH, salts of —CH2CH(CH3)COOH, —CH2CH(CH2COOH)COOH, and salts of —CH2CH(CH2COOH)COOH.

4. The process according to claim 3, wherein Z is selected from the group consisting of $CH_2$—COOH and —$CH_2CH_2COOH$.

5. The process according to claim 1, wherein P is obtained by modifying polyvinylamine and/or polyethylenimine.

6. The process according to claim 5, wherein said polyvinylamine and/or polyethylenimine is crosslinked.

7. The process according to claim 1, wherein said fountain solution has less than 15% by weight of volatile organic solvents having a boiling point of not more than 100° C.

8. The process according to claim 1, wherein said fountain solution is free of isopropanol, ethanol, or mixtures thereof.

9. The process according to claim 1, wherein said fountain solution is obtained by dilution of a concentrate comprising P.

10. The process according to claim 1, wherein P is dissolved.

* * * * *